(12) United States Patent
Senker

(10) Patent No.: US 7,028,003 B2
(45) Date of Patent: Apr. 11, 2006

(54) METHOD AND SYSTEM FOR THE RENTAL OF FURNITURE AND HOUSEWARES

(76) Inventor: James D. Senker, 8600 Honeybee La., Bethesda, MD (US) 20817

(*) Notice: Subject to any disclaimer, the term of this patent is extended or adjusted under 35 U.S.C. 154(b) by 705 days.

(21) Appl. No.: 10/293,554

(22) Filed: Nov. 14, 2002

(65) Prior Publication Data

US 2004/0098319 A1     May 20, 2004

(51) Int. Cl.
*G06F 17/60* (2006.01)
(52) U.S. Cl. ..................................... 705/26
(58) Field of Classification Search ............... 705/26, 705/27, 1, 500
See application file for complete search history.

(56) References Cited

U.S. PATENT DOCUMENTS

| | | | |
|---|---|---|---|
| 6,016,504 A | 1/2000 | Arnold et al. | |
| 6,285,986 B1 | 9/2001 | Andrews | |
| 6,321,202 B1* | 11/2001 | Raveis, Jr. | 705/1 |
| 6,684,196 B1* | 1/2004 | Mini et al. | 705/26 |
| 2002/0046213 A1 | 4/2002 | Vinati et al. | |
| 2002/0128853 A1* | 9/2002 | Kikuchi et al. | 705/1 |
| 2003/0078852 A1* | 4/2003 | Shoen et al. | 705/26 |

FOREIGN PATENT DOCUMENTS

JP     2002269207 A  *  9/2002

OTHER PUBLICATIONS

Stein, John F., *How to Set Up and Maintain a Web Site* 190-193. Massachusetts: Addison Wesley Longman, Inc., 1997 and Yeager.
Nancy J. et al., *Web Server Technology* 284-286. San Francisco: Morgan Kaufmann Publishers Inc., 1996.

* cited by examiner

*Primary Examiner*—Jeffrey A. Smith
(74) *Attorney, Agent, or Firm*—Richard C. Litman

(57) ABSTRACT

An Internet-based, computerized method and system enables renting real estate, furniture, and housewares in the same transaction. The same catalog of furniture and housewares is displayed to rental agents and to customers, but agents can see prices while customers cannot. System access is based on ranges of recognized Internet-protocol addresses. Thumbnail images link to enlarged pictures and lists of goods. Prices are totaled automatically, including tax. Agents place orders on-line. The system verifies the accuracy of orders and, if correct, returns a message that the order was placed successfully.

16 Claims, 19 Drawing Sheets

Figure 11:
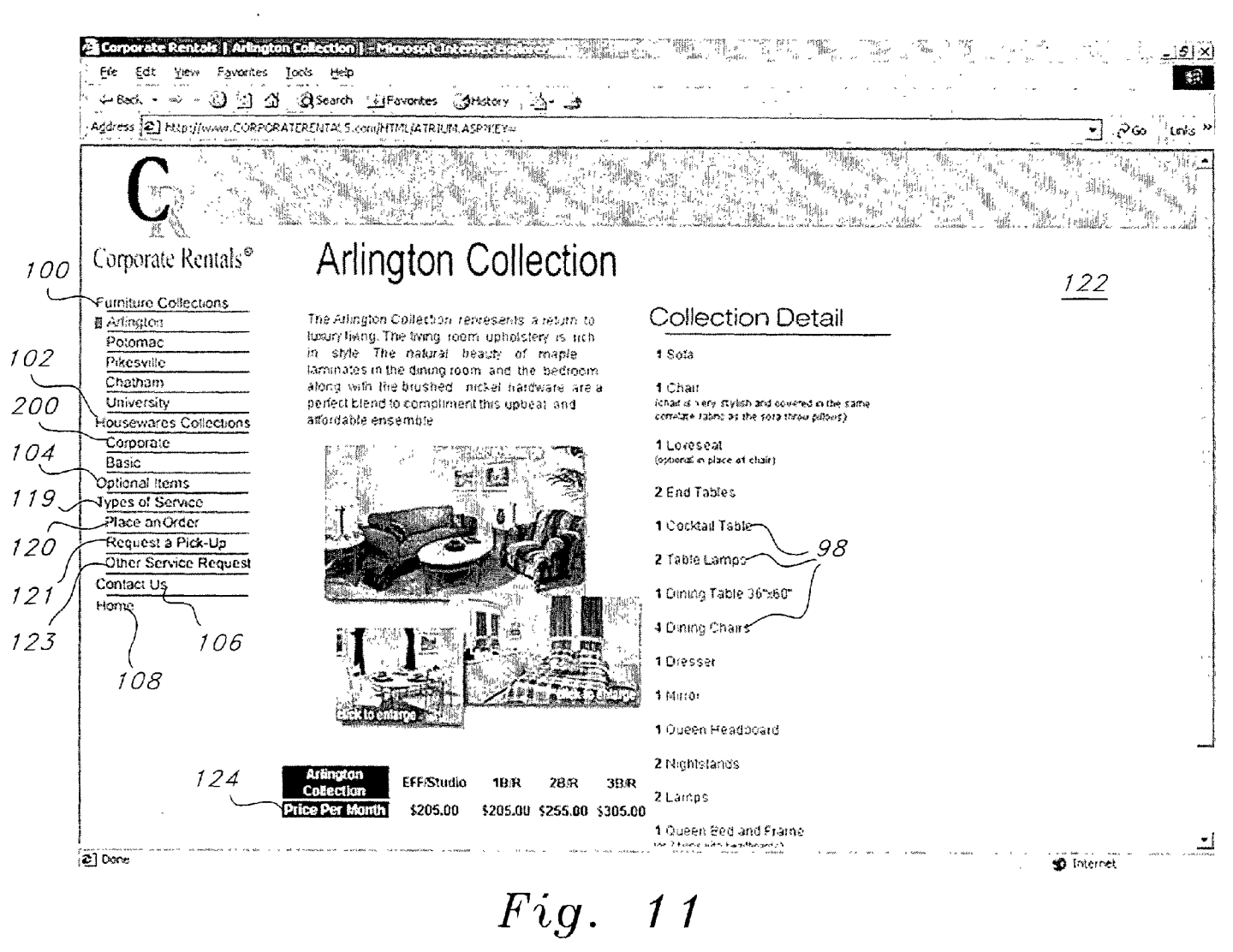

Corporate Rentals®

Furniture Collections
- Arlington
- Potomac
- Pikesville
- Chatham
- University

Housewares Collections
- Corporate
- Basic

Optional Items
Types of Service
Place an Order
Request a Pick-Up
Other Service Request
Contact Us
Home

Arlington Collection

The Arlington Collection represents a return to luxury living. The living room upholstery is rich in style. The natural beauty of maple laminates in the dining room and the bedroom along with the brushed nickel hardware are a perfect blend to compliment this upbeat and affordable ensemble.

| Arlington Collection Price Per Month | Eff/Studio | 1BR | 2BR | 3BR |
|---|---|---|---|---|
| | $205.00 | $205.00 | $255.00 | $305.00 |

Collection Detail

1 Sofa

1 Chair
(chair is very stylish and covered in the same coverage fabric as the sofa throw pillows)

1 Loveseat
(optional in place of chair)

2 End Tables
1 Cocktail Table
2 Table Lamps
1 Dining Table 36"x60"
4 Dining Chairs
1 Dresser
1 Mirror
1 Queen Headboard
2 Nightstands
2 Lamps
1 Queen Bed and Frame

METHOD AND SYSTEM FOR THE RENTAL OF FURNITURE AND HOUSEWARES

BACKGROUND OF THE INVENTION

1. Field of the Invention

The present invention relates to managing rentals of personal property, and particularly, to an Internet-based method and system for renting furniture and housewares in connection with the rental of real estate. The invention is particularly suited for the high-volume, commercial real estate/rental industry.

2. Description of the Related Art

Real estate rental agents routinely rent furniture and household goods to customers who also rent apartments. "Real estate rental agents", as used herein, refers to a residential property management company, a corporate housing company, or any other party who leases or arranges to lease real estate to another party. Residential property management companies typically lease real estate only, while corporate housing companies serve as consolidators in supplying bundled properties and services to corporations for short-term leases. A corporate housing company, for example, packages an apartment with furniture, housewares, and services such as cable TV, electric, Internet, and maid service.

The process of renting furniture and household goods for rental real estate is largely manual, labor intensive, and rife with errors. A typical transaction begins when a prospective real estate occupant expresses to a real estate rental agent an interest in renting real estate with accompanying rental furnishings and housewares. The real estate rental agent must then place a phone call to a furniture and housewares supplier. The person taking the order consults paper catalogs of household furnishings as well as paper copies of price listings in order to inform the real estate rental agent of the price for renting the desired items. Because the process is manual and especially complex when demand is high, human error can occur so that prices are routinely quoted wrong and totaled wrong.

When agents fax orders to suppliers, they must also phone the supplier to confirm that the fax was received and to verify the specifics of the order. Otherwise, suppliers must confirm the agents' orders by fax or by phone. The supplier often gives the rental agent a confirmation number over the phone, the agent writes down the number, and then the supplier and the agent may also enter the confirmation number into a computer. The offices of agents and suppliers are filled with stacks of faxes and manila folders containing order confirmations. Goods are misidentified and the wrong furniture and furnishings are delivered, often to the wrong address. Opportunities for errors abound, and mistakes are common.

The industry cries out for automation. Unfortunately, none of the prior art satisfies the need, as will be evident in the prior art cited below. Although other inventions use the Internet to rent property and household goods, none is designed for the commercial real estate-rental market, and none solves the multiple problems addressed by the present invention.

U.S. Publication No. 2002/0046213, published Apr. 18, 2002, discloses a method for managing rentals of real estate and personal property items over a data communications network. The invention is not designed for commercial use. Instead, it operates on a flea-market model. Individuals rent their own real estate and personal property. Nor can the Vinati invention maintain and manage catalogs of furniture and housewares provided by commercial suppliers.

U.S. Pat. No. 6,016,504, issued Jan. 18, 2000 to Arnold et al., discloses a design for a Web page that integrates multiple vendors into one shopping place. The invention is not designed for commercial use or for any rental market. The Arnold invention, like the Vinati invention, is designed for the general public. There is no way to display and maintain a catalog of rental goods.

U.S. Pat. No. 6,285,986, issued Sep. 4, 2001 to Christopher C. Andrews, discloses a method for interactive, automated registration, negotiation, and marketing for combining products and services from one or more vendors. The Andrews invention uses the Internet, but again, is intended for the general public, and cannot satisfy the needs of the commercial real estate-rental and corporate housing industry. Prices are shown directly to customers, and are not kept confidential. The Andrews invention contains no provision for order confirmation.

In a preferred embodiment of the present invention, access to a Web-based furniture catalog containing restricted information is controlled by Internet Protocol address recognition. Techniques for configuring access control based on Internet Protocol recognition are well-known in the art and described in numerous publications, including Stein, John F., *How to Set Up and Maintain a Web Site* 190–193. Massachusetts: Addison Wesley Longman, Inc., 1997 and Yeager, Nancy J. et al., *Web Server Technology* 284–286. San Francisco: Morgan Kaufmann Publishers Inc., 1996.

The present invention, by contrast, eliminates the manual process of renting real estate together with furniture and housewares, and meets an unfilled need in the industry. None of the above inventions and patents, taken either singly or in combination, is seen to describe the instant invention as claimed. Thus a business process for the rental of furniture and housewares solving the aforementioned problems is desired.

SUMMARY OF THE INVENTION

The present invention is an automated system and method which can be used to facilitate transactions in which real estate rental agents must arrange to rent furniture and housewares for a prospective real estate occupant, typically as an adjunct or ancillary service to the rental of real property. A catalog displaying a rental supplier's furniture and housewares, organized and marketed as a suite of furnishings, is displayed on at least one Web site on the Internet. The catalog is organized with publicly accessible web pages connected by hyperlinks which present images and text which show and list each component of the various suites, so that lessees may browse the catalog to select a desired suite of furnishings, but does not include price or ordering information. The prospective lessee contacts the real estate agent by phone, e-mail, or other means, and indicates the suite of furnishings desired. The catalog also contains web pages which have access restricted only to authorized real estate agents, access to the restricted pages being controlled by the server through screening of the domain name or Internet Protocol address of the agent's client computer. The real estate agent accesses the restricted catalog pages on the web site, which contain the same content as the publicly accessible catalog pages, but which also provide price information and links for submitting service request forms and orders for furniture and housewares to the supplier by e-mail. The supplier confirms the order by e-mail.

Rental prices quoted on the restricted catalog pages usually reflect prices which the real estate agent charges the lessees. The amount the supplier charges the real estate agent is agreed upon in advance and is typically less than the quoted retail cost. The use of catalog pages with published price information provided by the supplier and the use of electronic mail for confirmation of orders reduces human errors which may occur in the leasing of furnishings ancillary to the rental of real property, as well as reducing the volume of paperwork and labor required.

Accordingly, it is a principal object of the invention to provide an automated method and system for renting furniture and household goods and providing related services in connection with the rental of real estate.

It is another object of the invention to reduce human error in pricing rental furniture and household goods by providing an electronic catalog of furniture suites having published prices fixed by the supplier of the suite, access to the published prices being restricted to authorized rental agents.

It is a further object of the invention to reduce paperwork associated with the rental of furniture and household goods by providing an electronic catalog having pages with furniture suites priced by the supplier(s) of the suites linked to an order form producing an e-mail order sent to the supplier and an e-mail confirmation of the order returned to the rental agent.

Still another object of the invention is to provide an electronic catalog of rental furniture and household goods having publicly accessible web pages with only text and images of the furniture and household goods for viewing by prospective lessees, and restricted access web pages showing the same text and images together with price information and order forms accessible only by rental agents.

It is another object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 11 is a representative screen shot of a catalog page only accessible to authorized agents displaying a particular furniture collection.

FIG. 14 is a representative screen shot of a portion of an on-screen order page.

FIG. 18 is a representative screen shot of a pick-up request form.

Similar reference characters denote corresponding features consistently throughout the attached drawings.

DETAILED DESCRIPTION OF THE PREFERRED EMBODIMENT

The present invention is an automated rental system and method for facilitating rental of personal property items, in connection with rental of real estate.

Figure 1:
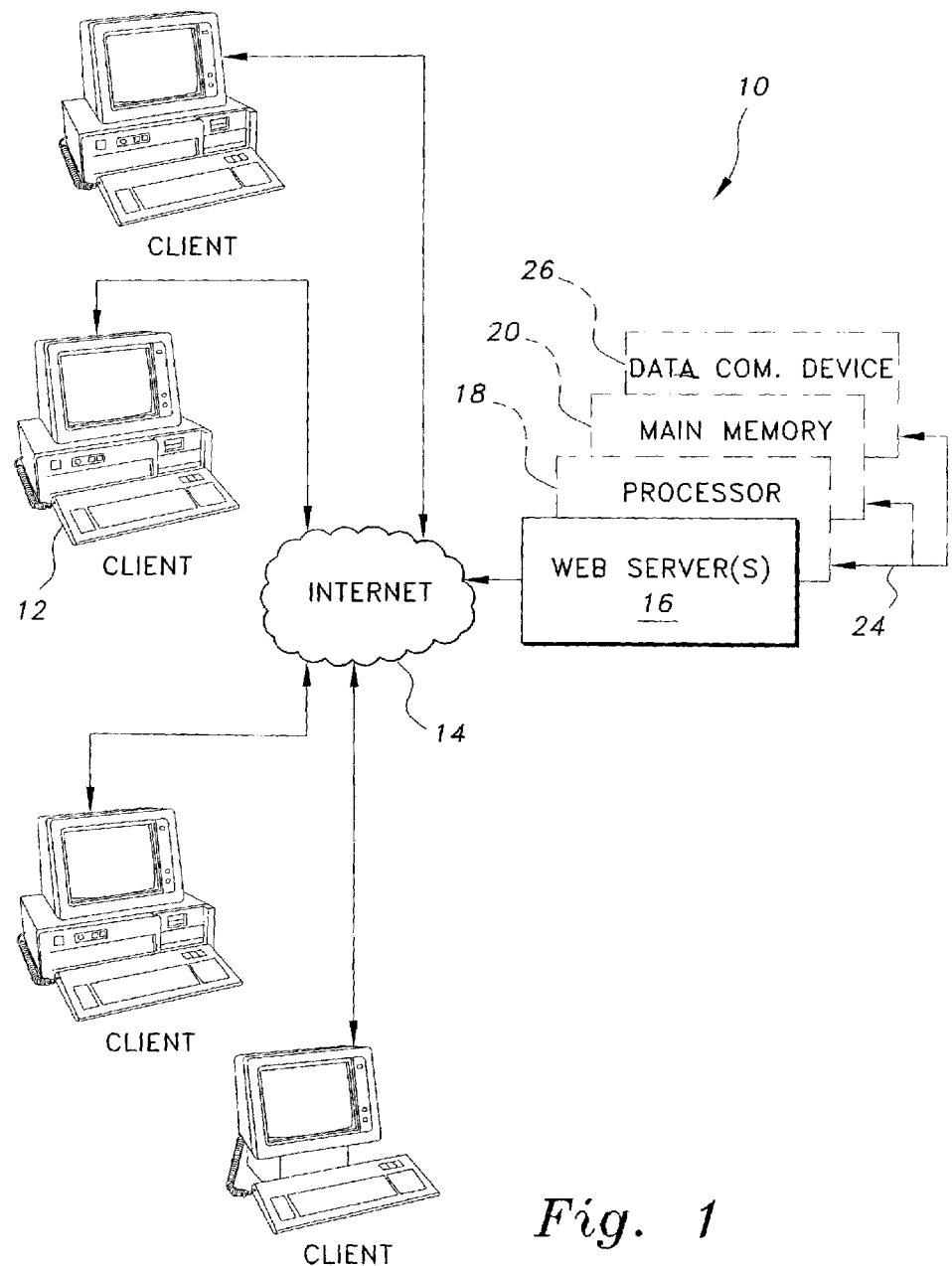
FIG. 1 is a block diagram of a system on which the method of the present invention may be practiced.

FIG. 1 shows a representative system on which the method of the present invention may be practiced. As is shown in FIG. 1, the system 10 uses a client-server model, including a plurality of client computers 12 connected to a Web server 16 through a computer network, preferably the Internet 14, although the computerized system 10 may also operate on an intranet or extranet. The Web server 16 has a processor 18 for processing instructions and an area of main memory 20 for executing program code under the direction of the processor 18 connected by a bus 24.

The client computers 12 have a Web browser operable thereon for receiving and viewing documents transmitted over the Internet 14 via hypertext transfer protocol (HTTP) by the Web server 16 and for transmitting requests for documents to the Web server 16 via HTTP.

The rental system 10 includes a web-based software program code. The software program code is stored on a computer readable medium which is operable in main memory 20 on the Web server 16 under direction of the processor 18 for managing rental of furniture and housewares, and is accessible to client computers 12 through the Internet 14. As used in the present application, the term "computer readable medium" refers to a hard disk drive, a floppy diskette, a ZIP disk or any other magnetic storage media capable of storing media capable of storing coded program instructions, an optical or laser storage device, such as a compact disk, laser disk, paper tape, punch cards or any other media for the storage of program instructions readable by a disk storage device or reader. The computer code may be written in Java (Java is a trademark of Sun Microsystems), HTML, XML, Microsoft's active server pages (ASP), or any other suitable computer language. Scripting languages, such as JavaScript, may also be used.

The Web-based program code executes in the main memory 20 under the direction of the processor 18, and includes Web server software which enables the system 10 to manage the rental of furniture and housewares on at least one Web site on the Internet 14; provide a Web-based catalog of furniture and housewares without prices for a prospective real estate occupant to view; provide a Web-based catalog of furniture and housewares with prices for a real estate rental agent to view; permit or deny access to a remote computer based on recognition of Internet Protocol addresses; allow a user to proceed from one Web page to another Web page by clicking on hypertext links; display thumbnail pictures of furniture; enlarge thumbnail pictures of furniture; display on-screen order forms in which orders for furniture, housewares, or related services may be placed; verify that order form is completed; calculate the total cost of an order, including tax; recalculate the total cost of an order if the ordering information has been changed; electronically send an order to a supplier; and electronically return a message to a real estate rental agent confirming that the order was placed successfully.

The rental system 10 is used to facilitate transactions involving rental of furniture and housewares in connection with rental of real estate. The system allows a supplier of furniture and housewares to display the supplier's rental furniture and housewares in an electronic catalog having both web pages accessible by the general public, and web pages accessibly only by authorized agents. The system 10 can be built to comply with a real estate rental agent's business rules and desired pricing structure. Preferably, the Web-based catalog will be incorporated into a real estate rental agent's existing Web site to facilitate a prospective real estate occupant's search for rental real estate, furniture and housewares. Only authorized users, i.e., a real estate rental agent with whom the supplier has made a previous agreement to lease furniture and housewares, may access the restricted web pages. Public users, such as prospective real estate occupants, only have access to the publicly accessible web pages. The publicly accessible web pages may be referred to herein as the "public catalog", while the restricted pages may be referred to herein as the "private catalog". While the private catalog is only accessible to authorized agents and the public catalog is accessible to public users, each may be accessed simultaneously on the same Web site by the different users.

Figure 2:
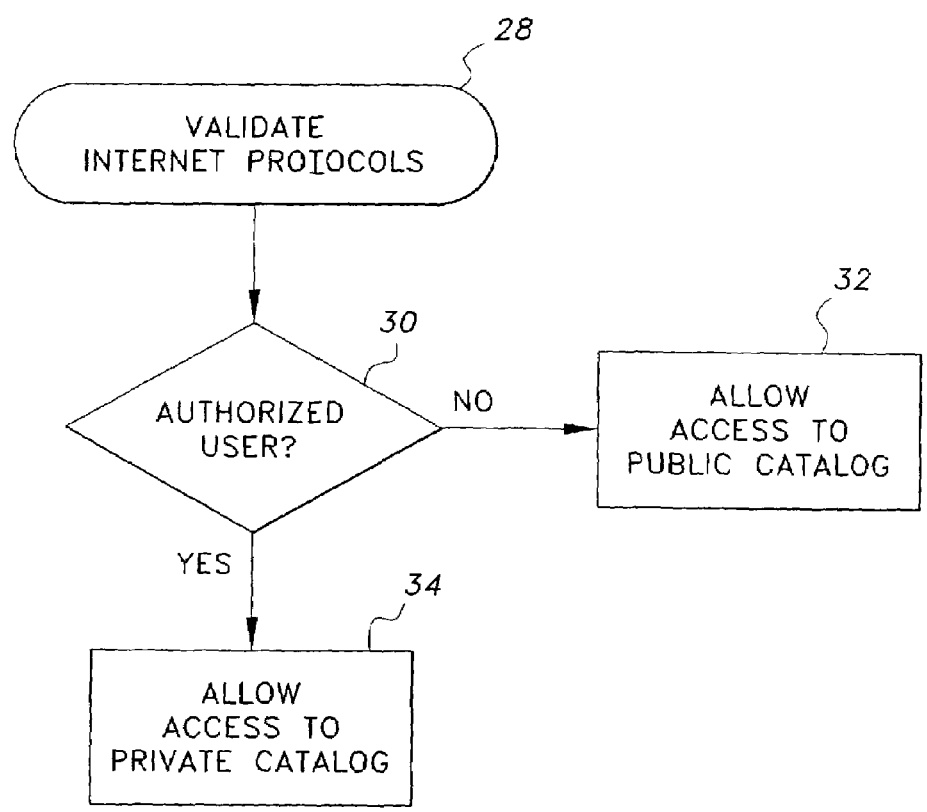
FIG. 2 is a flow chart depicting the system's Internet Protocol validation process.

As depicted in FIG. 2, the system can be designed to recognize an authorized agent based on the agent's Internet Protocol address, i.e., the domain name or Internet Protocol (IP) address of the machine used by the agent, according to programming techniques which are well-known in the art. This may be accomplished by storing the publicly accessible web pages and the restricted access web pages in separate directories and providing a configuration file which has been modified by the administrator of the web site to automatically provide access to the restricted directory for specified domain names or IP addresses, by associating an access key with the restricted files and appending the key to GET requests originating from specified domain names and IP addresses, or by any other programming method conventionally known in the art. Restricting access by identification of domain name or IP address has the advantage of freeing the web site from the necessity of maintaining user name and password files. The routine for validating Internet Protocols 28 determines whether the user is an authorized user at step 30. If so, the user is granted access to the private catalog at step 34, otherwise the user is granted access to the public catalog at step 32.

Figure 3:
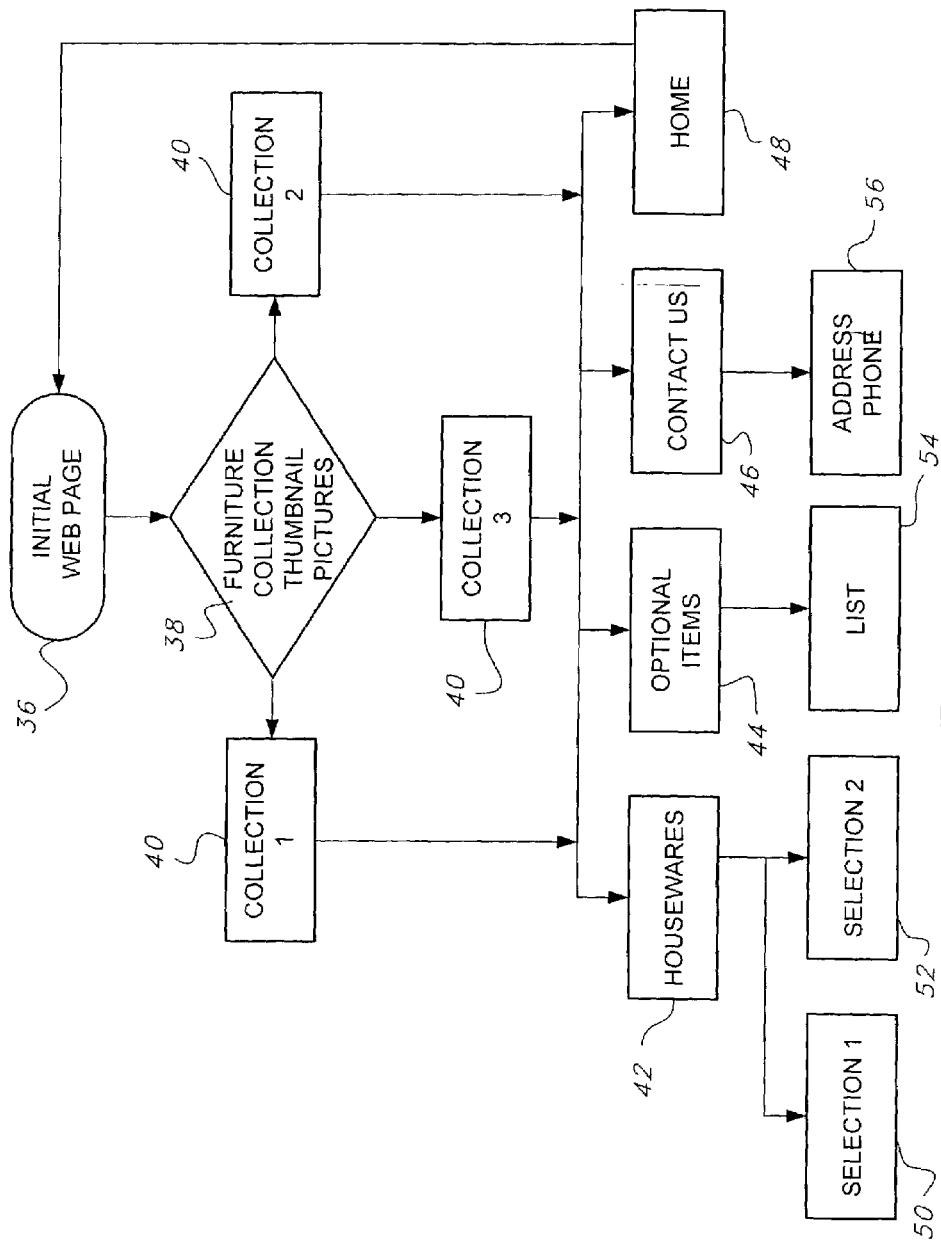
FIG. 3 is a block diagram of Web pages from the Web-based electronic catalog which are accessible to public users.

A public user accessing the Web site will be directed to an initial Web page 36, having links to other publicly accessible web pages, as depicted in the block diagram of FIG. 3. The web page 36 has a plurality of thumbnail pictures of furniture suites available for rental. Clicking on a picture 38 takes the user to a particular furniture collection page 40 where descriptive information on a particular furniture collection is provided. Hypertext links available on a furniture collection page 40 include, but are not limited to housewares 42, optional items 44, contact information 46, and home 48 and allow the user to access other Web pages in the catalog. The housewares link 42 leads to Web pages displaying household items which are available for rent, including, but not limited to, dishware and linens, represented by selection 1 50 and selection 2 52, respectively, in FIG. 3. The optional items link 44 takes the user to a Web page listing luxury household items. The contact information link 46 takes the user to a Web page which displays the contact information of the company running the web site. The home link 48 is a standard Web-page link that takes the user back to the initial Web page 36.

After noting rental items of interest, a prospective lessee may contact the rental agent handling the rental of the real property to determine prices for the rental items of furniture and housewares for price information and/or to place an order. The contact may be by phone, in person, by facsimile, by e-mail, or by any other means. The lessee will advise the rental agent of the items of interest, and the rental agent will then access the restricted access pages of the electronic catalog for price and order information.

Figure 4:
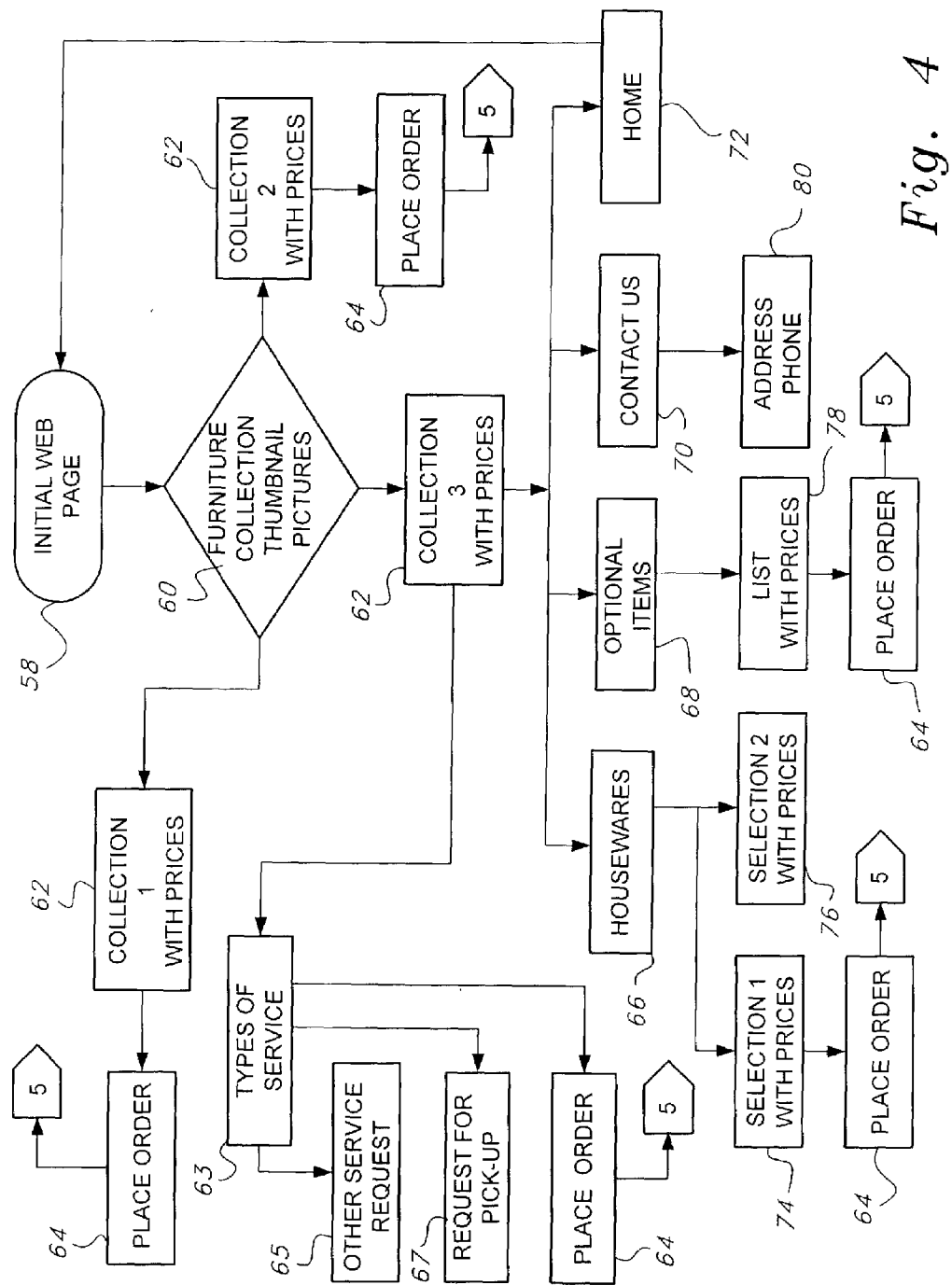
FIG. 4 is a block diagram of Web pages from the Web-based electronic catalog which are accessible only to authorized real estate agents.

As discussed earlier, the system will automatically grant the authorized real estate agent access to the private catalog, based on Internet Protocol address recognition. A block diagram depicting Web pages in the private catalog is depicted in FIG. 4. As is shown, the private catalog includes the information provided in the public catalog as well as prices for rental items. Accordingly, the private catalog has an initial Web page 58, or home page, with furniture collection thumbnail pictures 60. Clicking one of the pictures will display a page 62 with the suite or collection which also includes prices. The collection pages 62 include links to pages for housewares 66, optional items 68, contacting the web site 70 and links 72 to return to the home page. The housewares page 66 shows a first selection with prices 74, a second selection with prices 76, etc., with a link to the order page 64. The optional items page 68 includes a list with prices 78, with a link to the order page 64. The contact us page 70 lists the address and phone number 80 of the company running the web site. Additionally, the collection pages 62 have listed under types of services 63, links for service request forms for pick-up of rental items 67 and other services 65, as well as the order page 64 for placing orders for furniture and housewares.

Figure 5:
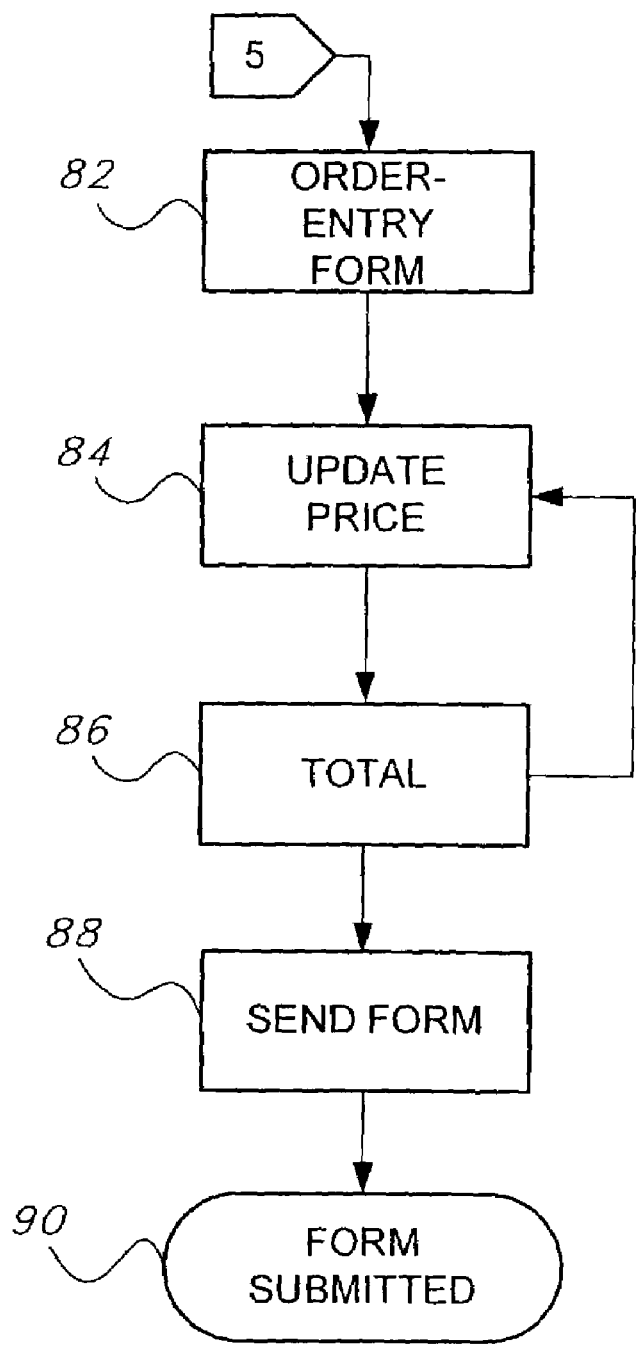
FIG. 5 is a flow chart depicting the steps involved in placing an order.

FIG. 5 depicts the order entry process for furniture and housewares. The order entry process includes the steps of processing 82 information entered in the order page 64 by the authorized agent, updating 84 the price, calculating 86 the total price of all items ordered, electronically sending 88 the order page 64 to the supplier, and electronically returning 90 confirmation to the real estate agent that the order page 64 was submitted. The authorized agent has the option of changing the order and updating 84 the price again before the step 88 of sending the page 64. In addition to posting a page confirming receipt of the order page 64, the web site will package the order page 64 in an e-mail which is sent to the supplier, and will e-mail a copy of the order information to the agent. Upon receipt of the order page 64, the supplier likewise will e-mail confirmation of receipt of the order page 64 to the agent.

Figure 6:
FIG. 6 is a representative screen shot of the initial Web page from the Web-based electronic catalog which is accessible to public users.
Figure 7:
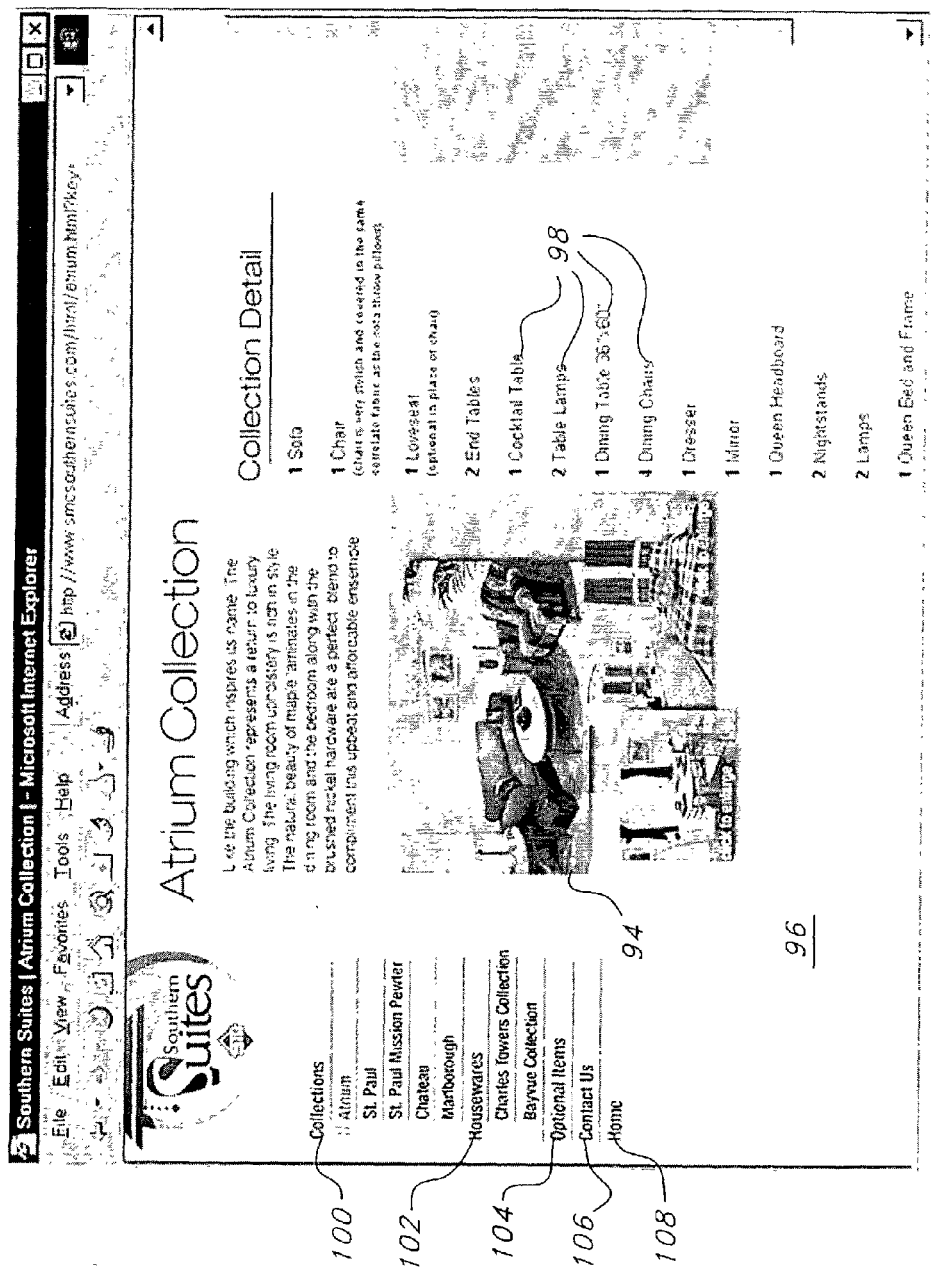
FIG. 7 is a representative screen shot of a catalog page accessible to public users which displays a particular furniture collection.
Figure 8:
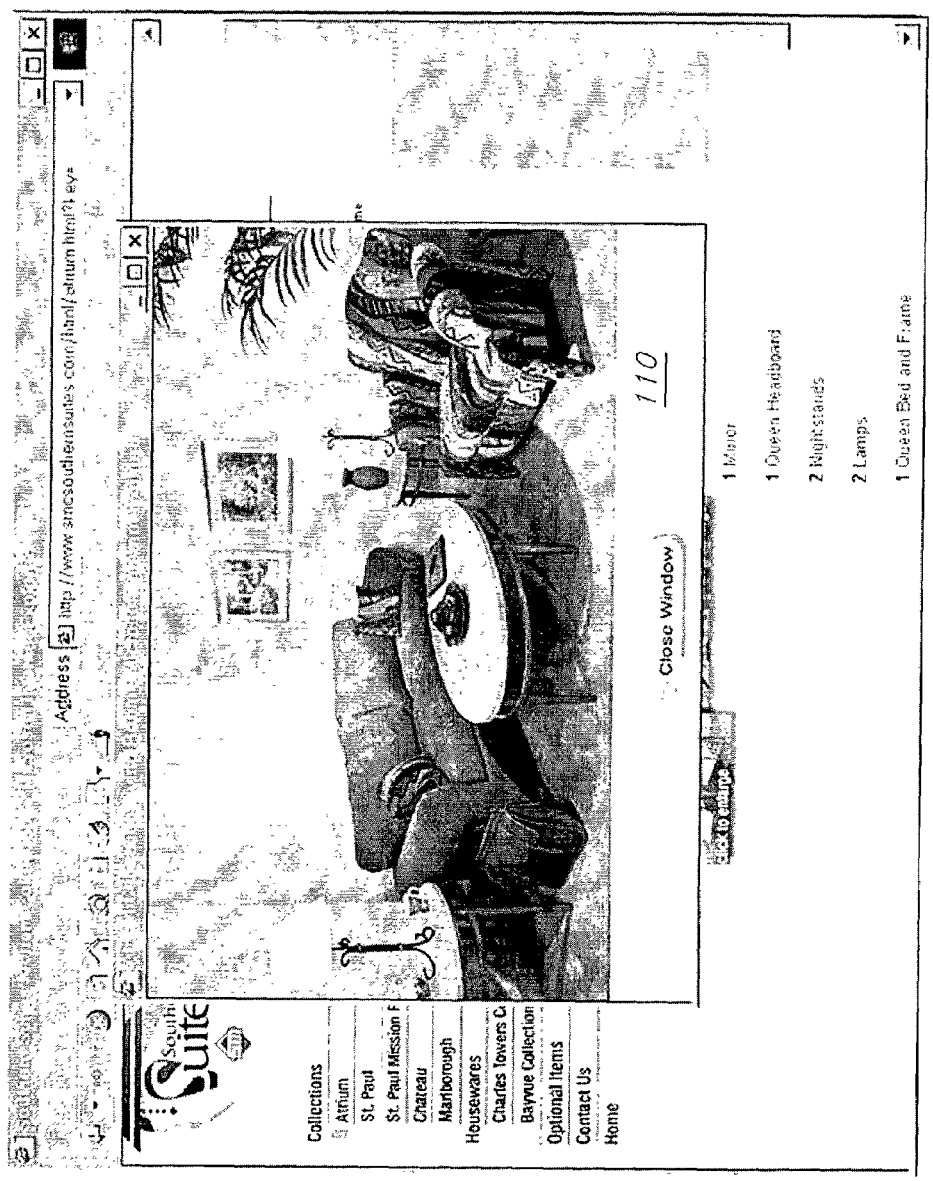
FIG. 8 is a representative screen shot of an enlargement of the particular furniture collection that is displayed in FIG. 7.
Figure 9:
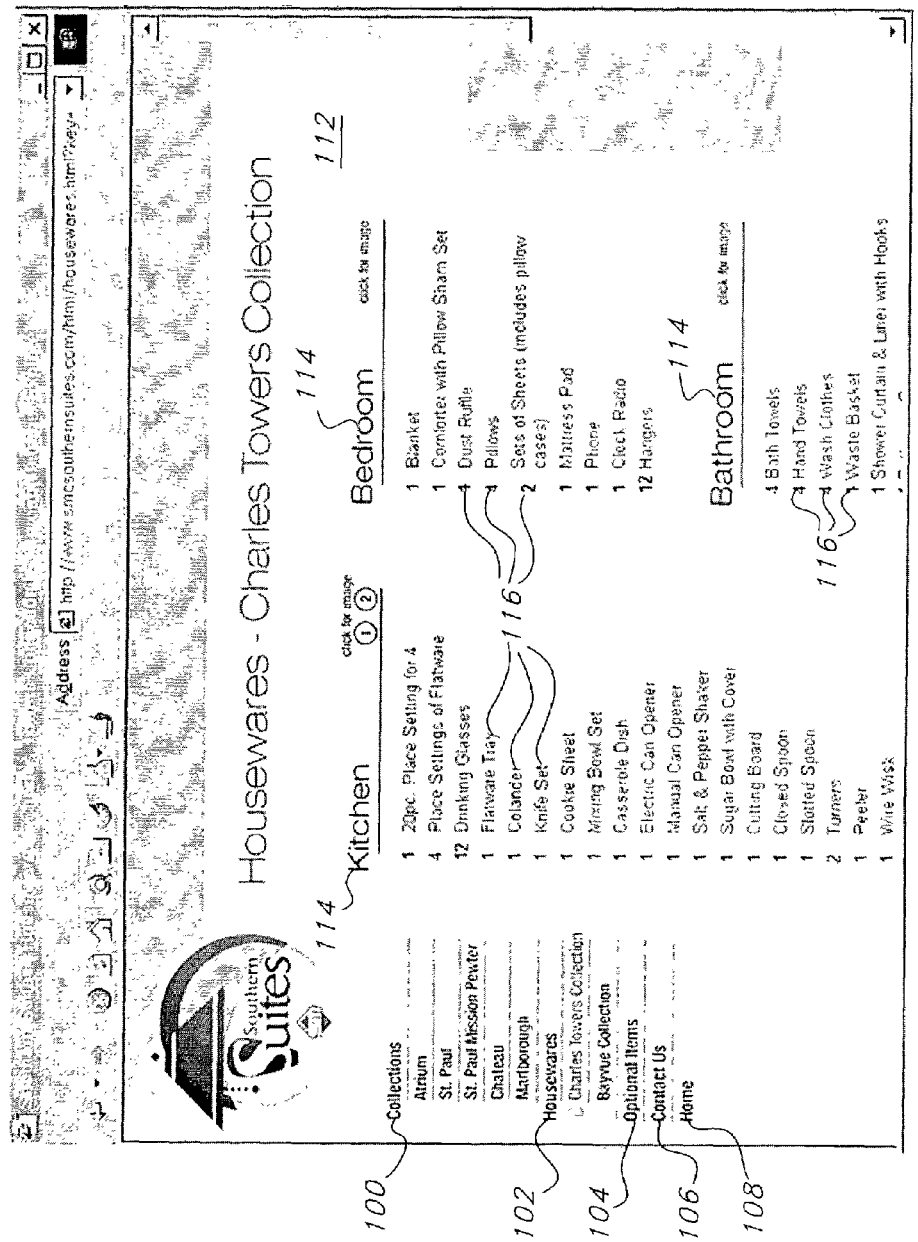
FIG. 9 is a representative screen shot of a portion of a catalog page accessible to public users displaying housewares available for rent.

FIGS. 6–9 depict representative examples of Web pages in the public catalog. It will be understood that the screen shots in the drawing Figures are shown in a MICROSOFT INTERNET EXPLORER window (MICROSOFT and INTERNET EXPLORER are trademarks of Microsoft Corporation); however, any browser may be used to practice the present invention. FIG. 6 depicts an initial Web page 92 wherein thumbnail pictures 94 of the rental furniture are displayed. The authorized user clicks on one of the pictures 94 and is taken to a furniture collection Web page 96 which lists the details 98 of the particular furniture collection, as depicted in FIG. 7. Links to other Web pages for other furniture collections 100, housewares 102, optional items 104, contact information 106, and home 108, are also provided. When the authorized user clicks on a picture 94 on the furniture collection page 96, a pop-up, enlarged picture 110 is displayed, as depicted in FIG. 8. When the authorized user clicks on a housewares link 102, a list of household items 116 is displayed, as depicted in FIG. 9. The household items 116 are categorized under room headings 114 designating the particular rooms in which the items may be used. Links to other Web pages for furniture collections 100, housewares 102, optional items 104, contact information 106, and home 108 are also provided as described for FIG. 7.

Figure 10:
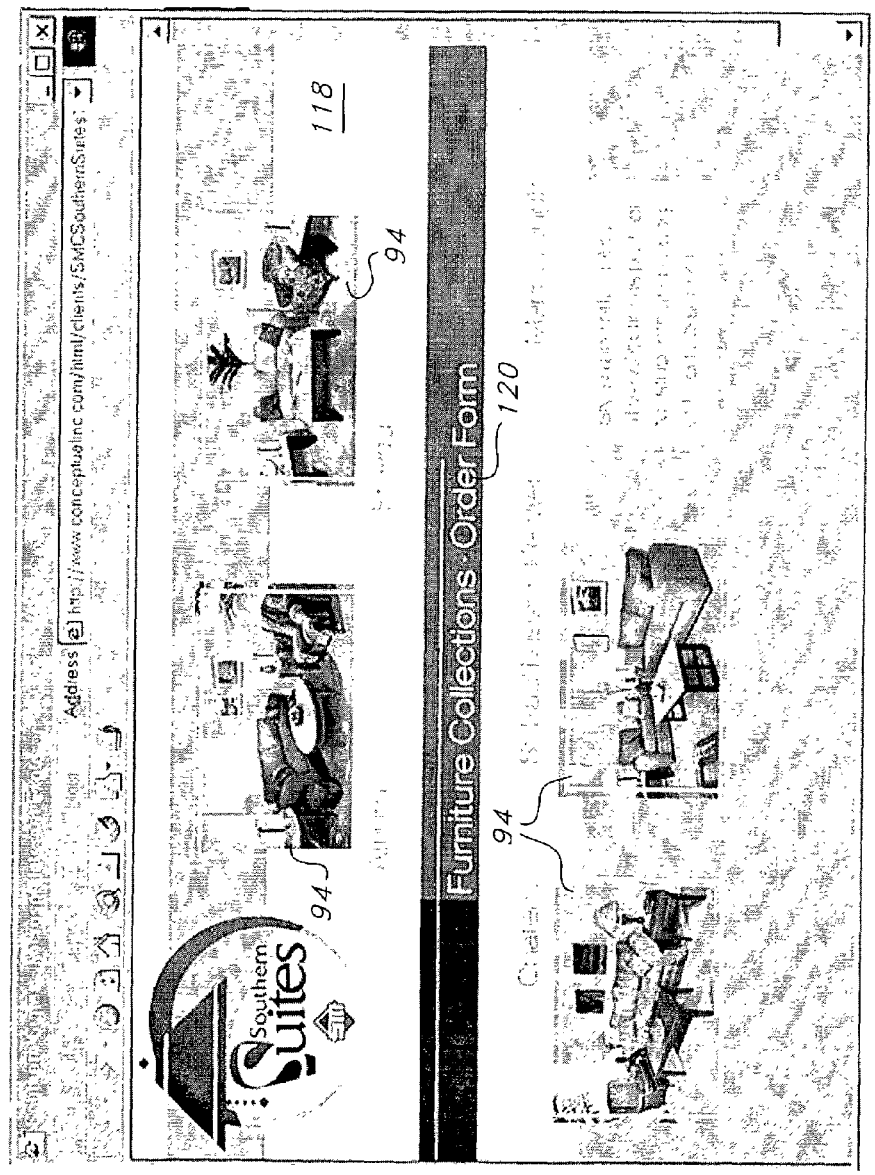
FIG. 10 is a representative screen shot of the supplier's initial electronic catalog page accessible only to authorized real estate agents.

FIGS. 10–17 depict Web pages of the private catalog. The Web pages for the private catalog depicted in FIGS. 10–13 are similar to those of the public catalog depicted in FIGS. 6–9 except that rental price information 124, an order page 132 and service request forms including, a pick-up request form 133 and other service request form 137, are also provided. As shown in FIG. 10, the private catalog home page 118 includes image links 94 to the furniture suites and housewares collections offered as well as an order page link 120. An exemplary furniture collection page 122 from the private catalog is shown in FIG. 11, which contains the same content as the publicly accessible page 96 of FIG. 7 (except that the name(s) of the collection(s) shown in the illustrations have been altered; in practice they would be identical), but also includes price information 124, pick-up request link 121, other service request link 123, and an order page link 120 for placing furniture and housewares orders. As with FIG. 7, links to the various collections, such as the "Corporate Collection" 200 of housewares, are provided.

Figure 12:
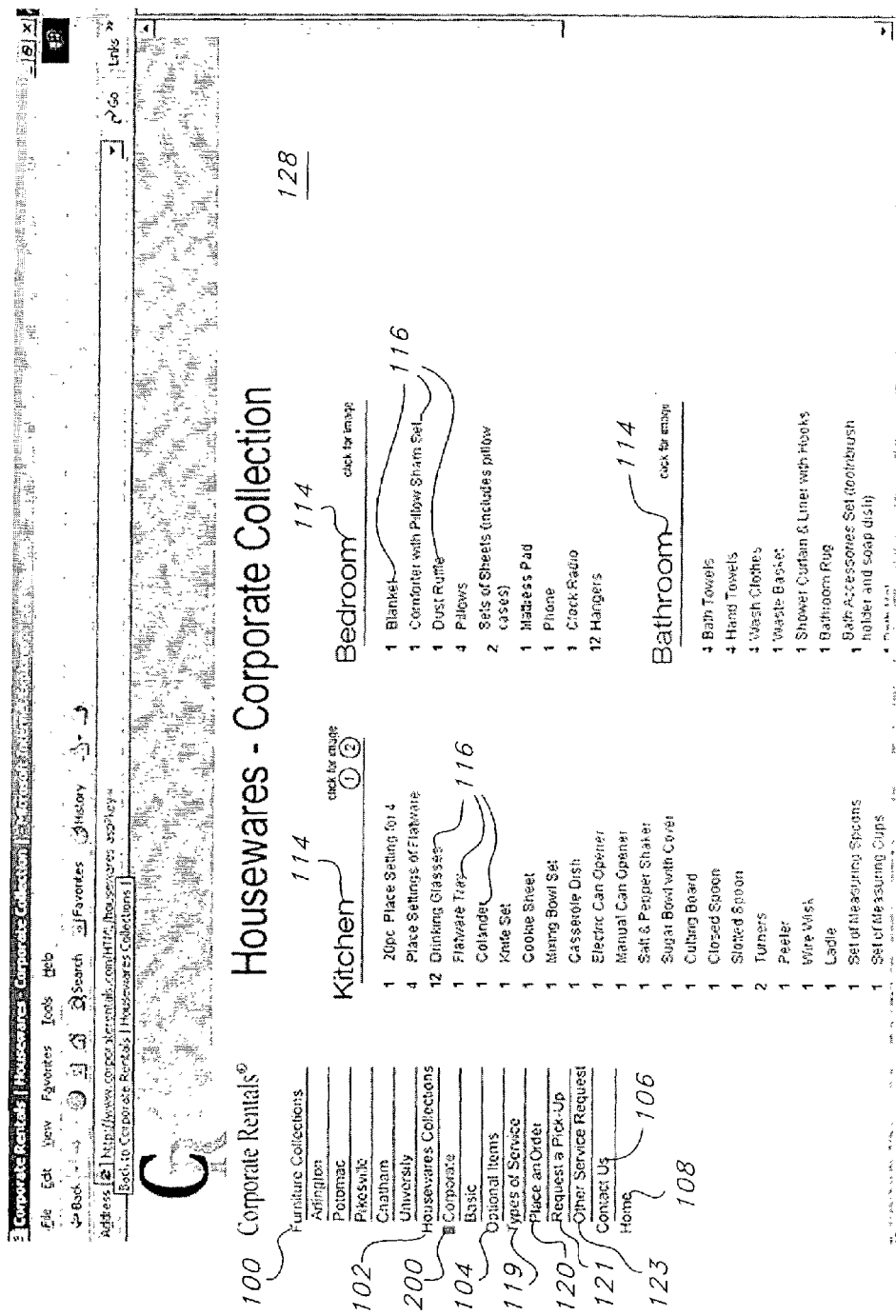
FIG. 12 is a representative screen shot of a catalog page only accessible to authorized agents displaying exemplary housewares available for rent.
Figure 13:
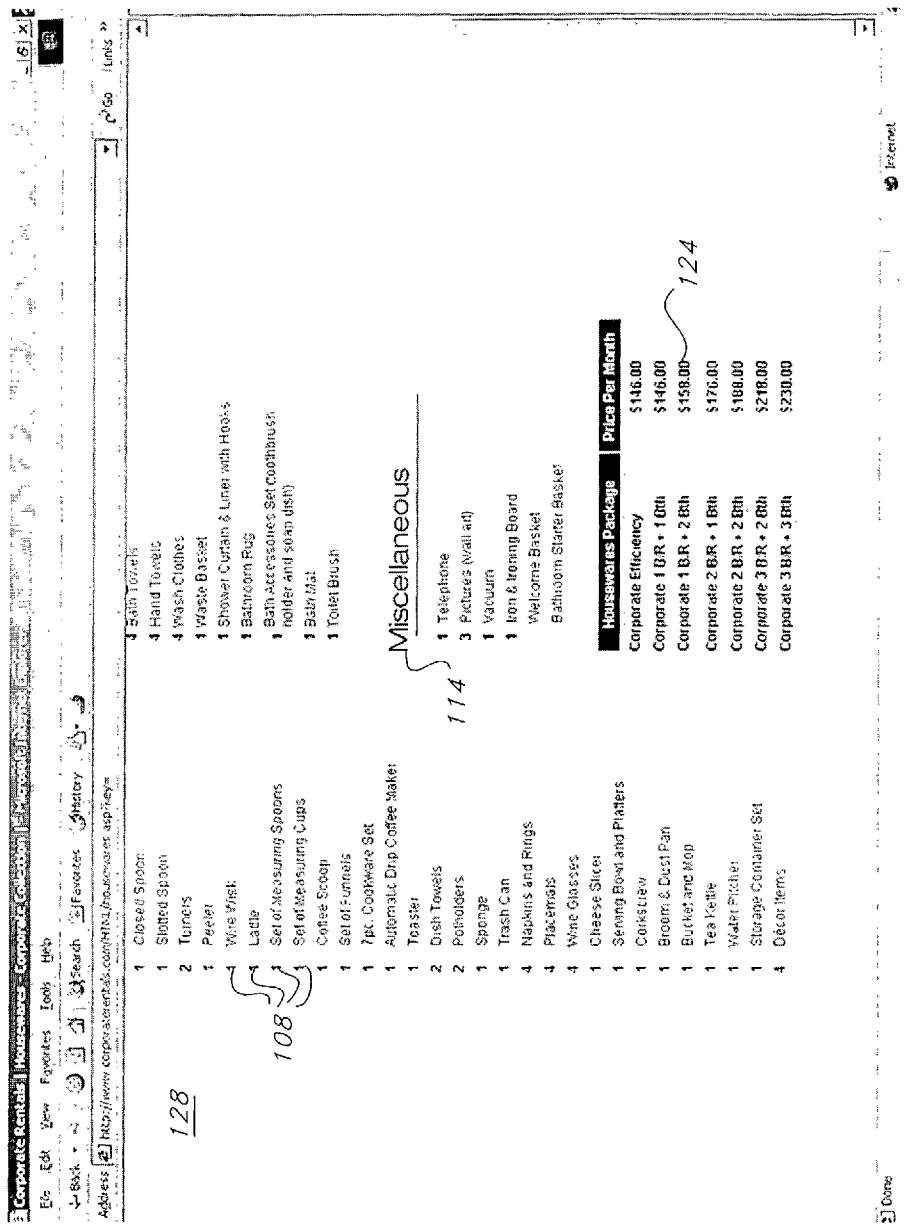
FIG. 13 is a continuation of the catalog page of FIG. 12.

FIGS. 12 and 13 depict the web page 128 shown when link 200 is selected as in the case of the furniture selection pages, the private catalog housewares page 128 has the same content as the corresponding public catalog page 112 of FIG. 9 (again the name of the collection(s) have been altered in the illustrations, but would be identical in practice), but includes the same menu of links on the left side of the page as FIG. 11, and also includes price information 124.

Figure 14:
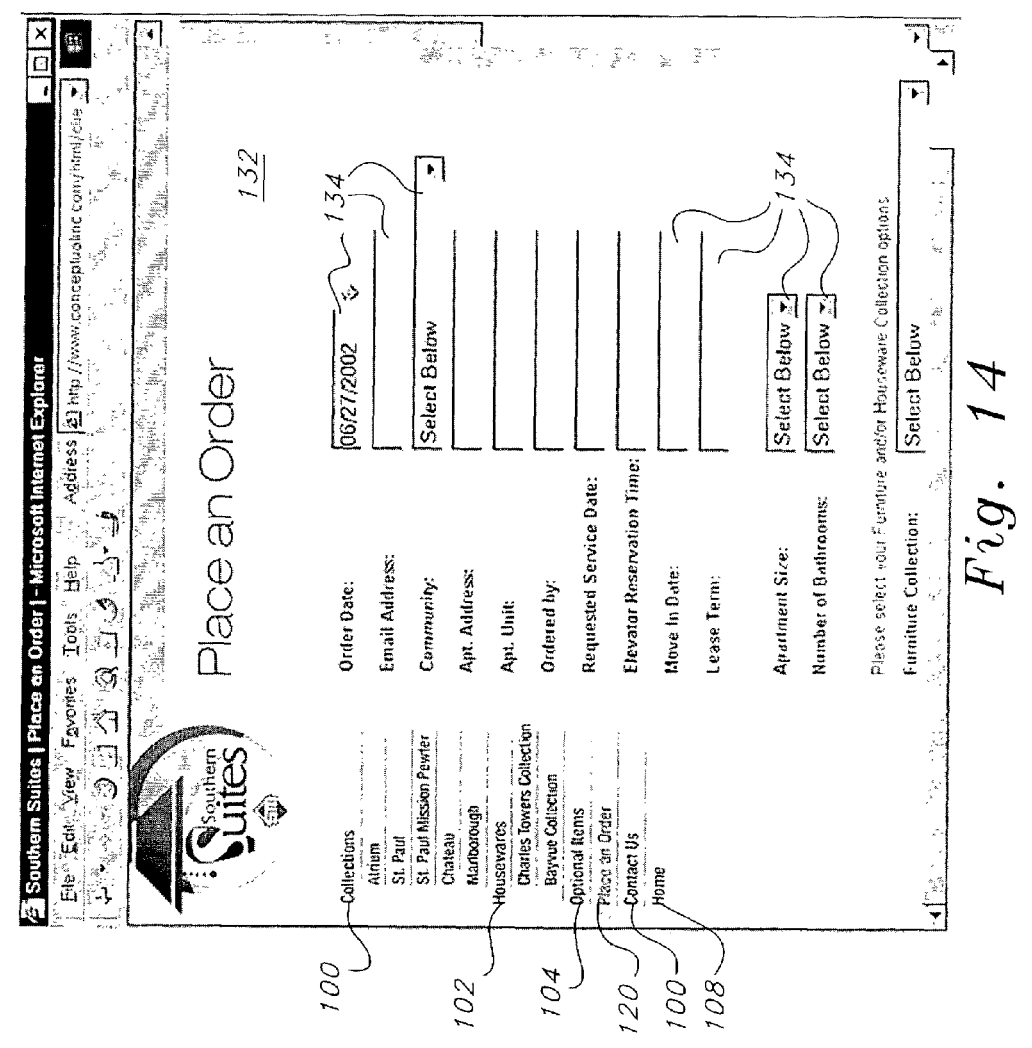

An exemplary order page 132 is depicted in FIG. 14. When the authorized user clicks on the order page link 120, the on-screen order page 132 appears. The authorized user provides the appropriate order information in fields 134 of the order page 132.

Figure 15:
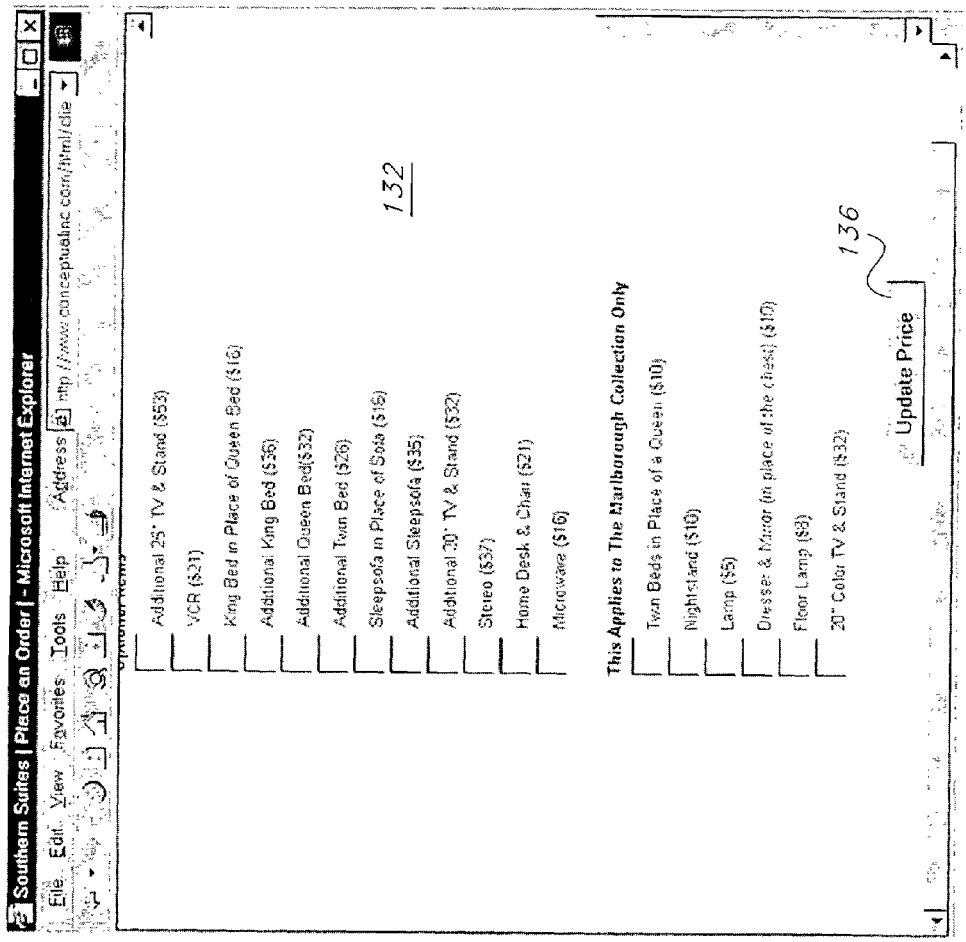
FIG. 15 is a continuation of the order page of FIG. 14.
Figure 16:
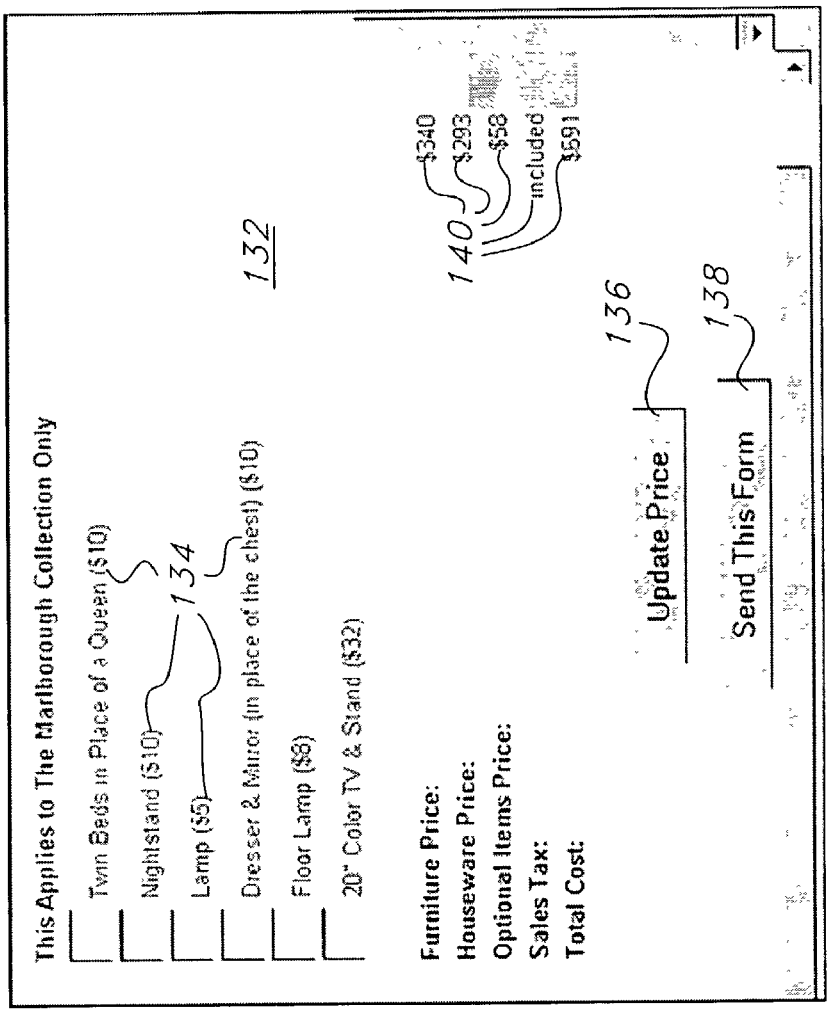
FIG. 16 is a bottom portion of the order page of FIG. 15.
Figure 17:
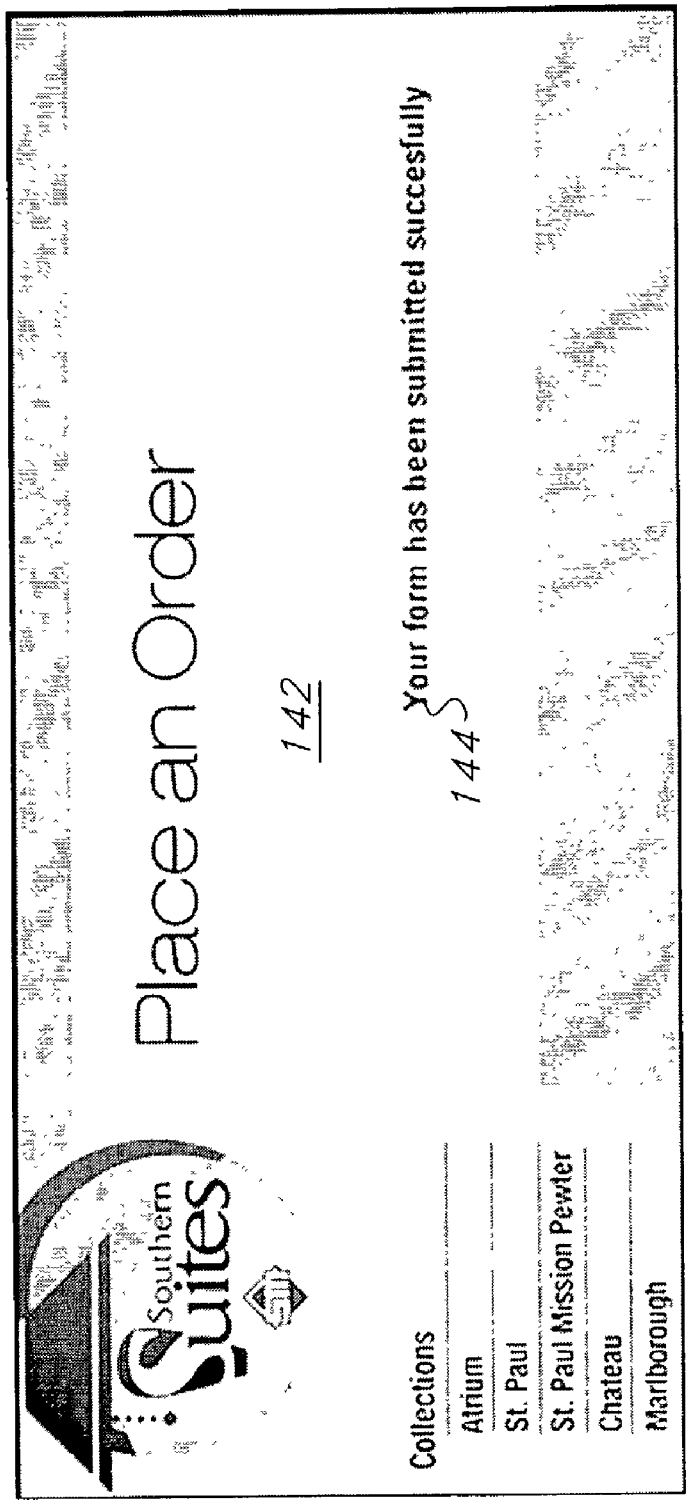
FIG. 17 is a fragmented screen shot of an order confirmation form Web page.

FIG. 15 depicts a continuation of the on-screen order page 132. Once satisfied with the entries, the authorized user may click a price updating button 136. The system first verifies that the order page 132 has been completed, then calculates the prices, adds tax if necessary, and provides a total cost of rental. FIG. 16 depicts a partial view of the display which appears once the totals have been calculated. If the authorized user wishes to make any changes to the selections, the price updating button 136 may be clicked again to obtain a new set of FIGS. 140. The on-screen order page 132 can be electronically transmitted to the web site by clicking on the transmit button 138. The system automatically provides a reply 142 with a message 144 indicating that the order page 132 has been submitted successfully as shown in FIG. 17. The web site transmits the order to the supplier by e-mail. The supplier may also manually send an additional electronic mail message confirmation attaching the order form 132 to confirm receipt of the order.

Figure 18:
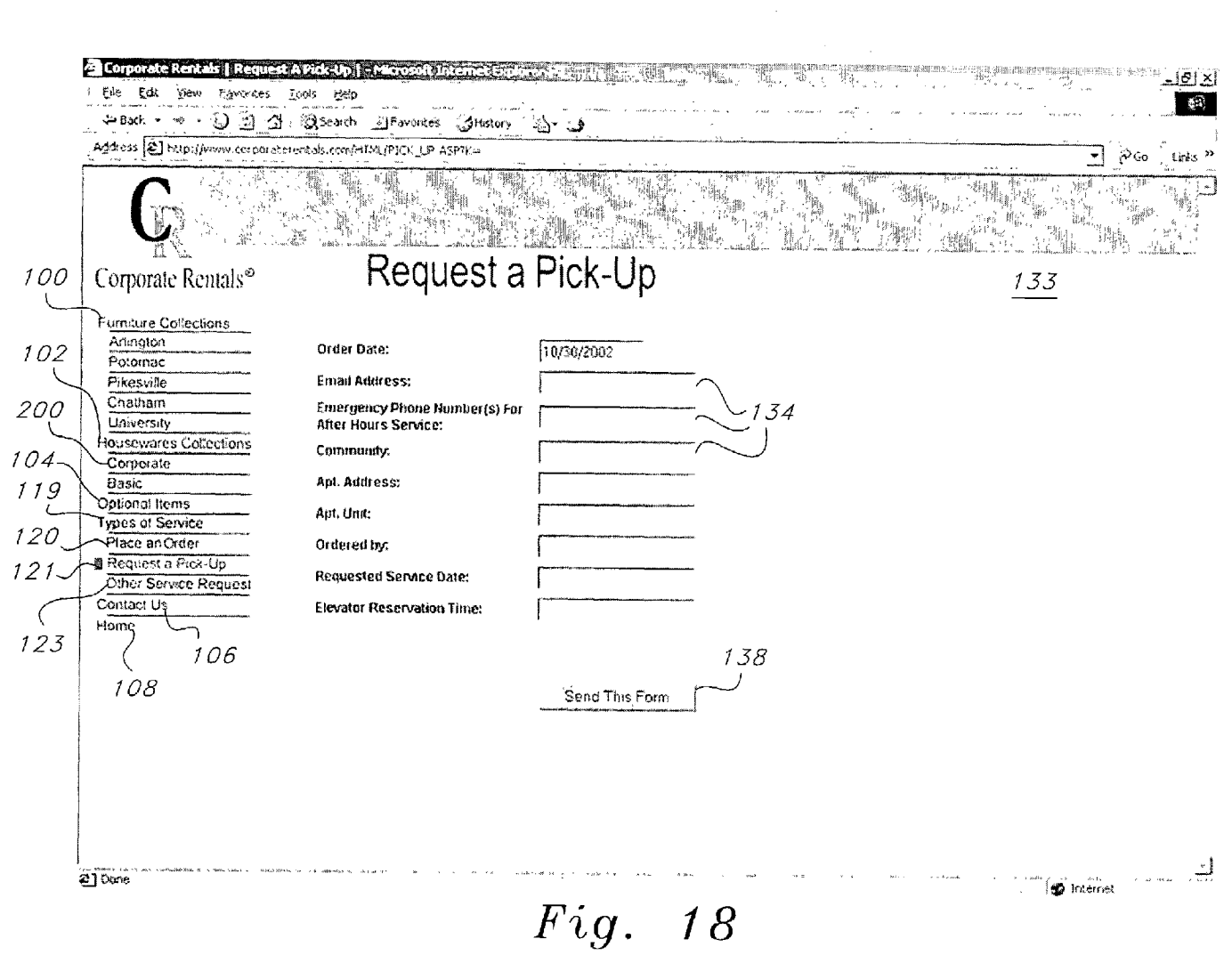

FIG. 18 depicts the pick-up request form 133. The authorized user provides the required information in fields 134 of the pick-up request form 133 in order to schedule a time and date for the rental items to be reclaimed by the supplier. The pick-up request form 133 can be electronically transmitted to the supplier by clicking on the transmit button 138. The procedure confirming receipt of the pick-up request form 133 is the same as that described for the order page 132.

Figure 19:
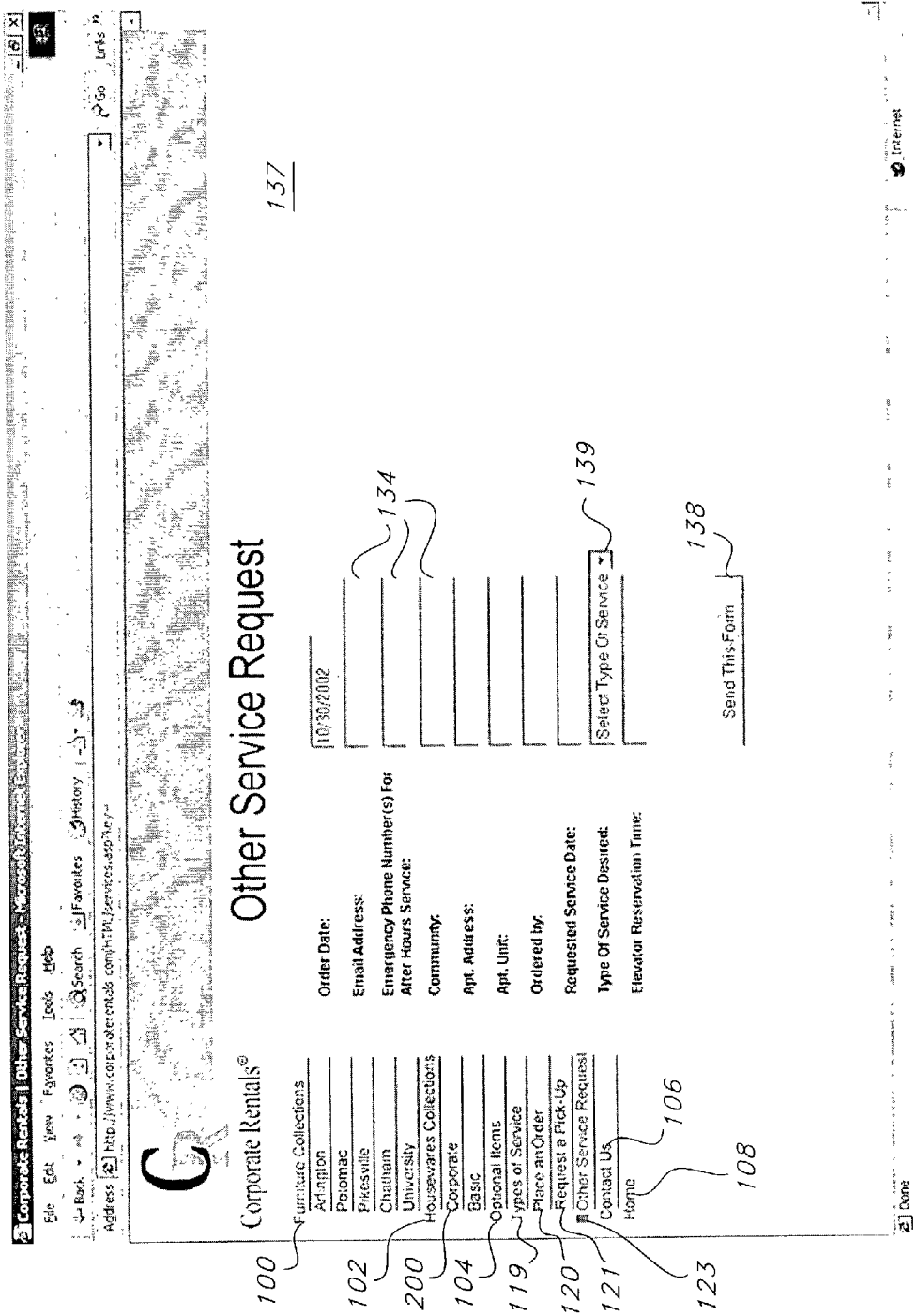
FIG. 19 is a representative screen shot of a service request form.

FIG. 19 depicts the "Other Service" request form 133. The authorized user provides the required information in fields 134 of the other service request form 133 in order to request other services, including, but not limited to, houseware fluff, maid service, carpet cleaning, and furniture exchange. A drop down list box 139 is provided with a list of the various types of services available so that the authorized user may specify type of service desired. The other service request form 133 can be electronically transmitted to the supplier by clicking on the transmit button 138. The procedure for confirming receipt of the other service request form 139 is the same as that described for the order page 132.

The basic steps in a computerized method for rental of furniture and housewares comprise the following steps: publishing a web site on the Internet having an electronic catalog of furniture suites and housewares collections for rent by at least one supplier, the catalog having publicly accessible web pages containing only images and text describing the suites and collections, and having restricted access web pages having the same content as the publicly accessible pages and further including price information and an order form accessible through a hypertext link; registering authorized rental agent users by domain name and IP address; screening GET requests by domain name and IP address; receiving a GET request for a catalog web page; automatically displaying the publicly accessible web pages when the GET request originates from a domain name and IP address which has not been registered; automatically displaying the restricted access pages when the GET request originates from one of the authorized users; receiving a completed order form from at least one of the authorized rental agent users; sending an electronic mail message confirming receipt of the completed order form to said at least one of the authorized rental agent users; and sending a copy of the completed order form to the at least one supplier by electronic mail.

It is to be understood that the present invention is not limited to the embodiment described above, but encompasses any and all embodiments within the scope of the following claims.

I claim:

1. A computerized method for rental of furniture and housewares, comprising the steps of:
   publishing a web site on the Internet having an electronic catalog of furniture suites and housewares collections for rent by a supplier, the catalog having publicly accessible web pages containing only images and text describing the suites and collections, and having restricted access web pages having the same content as the publicly accessible pages and further including price information and an order form accessible through a hypertext link;
   registering authorized rental agent users by domain name and IP address;

receiving a GET request for a catalog web page;
screening the GET request by domain name and IP address;
automatically displaying the publicly accessible web pages when the GET request originates from a domain name and IP address which has not been registered;
automatically displaying the restricted access pages when the GET request originates from one of the authorized users;
receiving a completed order form from at least one of the authorized rental agent users;
sending an electronic mail message confirming receipt of the completed order form to said at least one of the authorized rental agent users; and
sending a copy of the completed order form to the supplier by electronic mail.

2. The computerized method according to claim 1, further comprising the step of publishing revised web pages in said electronic catalog.

3. The computerized method according to claim 1, further comprising the step of calculating the total price of items on the completed order form.

4. The computerized method according to claim 1, wherein said restricted access web pages further comprise at least one service request form accessible through a hypertext link.

5. The computerized method according to claim 4, further comprising the steps of:
receiving at least one completed service request form from at least one of the authorized rental agent users;
sending an electronic mail message confirming receipt of said at least one completed service request form to said at least one of the authorized rental agent users;
sending a copy of said at least one completed service request form to the supplier by electronic mail.

6. An automated rental system for renting furniture, and household goods, in connection with real estate rental, comprising:
at least one server computer having a processor, an area of main memory for executing program code under the direction of the processor, a storage device for storing data and program code and a bus connecting the processor, main memory and the storage device;
a data communications device connected to said bus for connecting said server computer to a computer network;
a computer program code for rental of furniture and housewares in connection with rental of real estate, the code being stored in said storage device and executing in said main memory under the direction of said processor, the computer program including:
means for publishing a web site;
means for publishing an electronic catalog of furniture suites and housewares collections on said web site, the electronic catalog having publicly accessible web pages containing images and text descriptions of the furniture suites and housewares collections, and having restricted access web pages with identical content to the publicly accessible web pages and further including price information and order forms;
means for permitting or denying access to the restricted access web pages based on recognition of Internet-protocol addresses;
means for publishing an on-screen order form in which authorized users may enter ordering information to place an order for furniture and housewares;
means for verifying that said order form has been completed;
means for electronically sending said order form to a supplier of rental furniture and housewares; and
means for electronically sending an electronic mail message indicating an order was placed successfully.

7. The rental system according to claim 6, wherein said computer network is the Internet.

8. The rental system according to claim 6, further comprising means for restricting access to the restricted access web pages to authorized rental agents.

9. The rental system according to claim 6, wherein said authorized users comprise rental agents operating client computers having a domain name and Internet Protocol address registered with said web site.

10. The rental system according to claim 6, wherein the images comprise thumbnail pictures of furniture and household goods in said electronic catalog.

11. The rental system according to claim 10, further comprising means for enlarging said thumbnail pictures.

12. The rental system according to 6, further comprising means for recalculating the total cost of said order when ordering information has been changed.

13. The rental system according to claim 6, wherein said restricted access web pages further include at least one service request form.

14. The rental system according to claim 6, further comprising:
means for publishing at least one service request form in which authorized users may enter information for submitting requests for services;
means for verifying that said at least one service request form has been completed;
means for electronically sending said at least one service request form to a supplier of rental furniture and housewares; and
means for electronically sending an electronic mail message indicating that said at least one service request form was submitted successfully.

15. A computer program product that includes a medium readable by a processor, the medium having stored thereon a set of instructions for renting furniture and housewares, in connection with rental of real estate, comprising:
a first sequence of instructions which, when executed by the processor, causes the processor to display a web-based public catalog of furniture and household goods, without prices, said public catalog comprising a plurality of Web pages for an unauthorized user to view;
a second sequence of instructions which, when executed by the processor, causes the processor to display a web-based private catalog of furniture and household goods, with prices, said private catalog comprising a plurality of Web pages for an authorized user to view;
a third sequence of instructions which, when executed by the processor, causes the processor to permit access to said authorized user, based on recognition of Internet-protocol addresses;
a fourth sequence of instructions which, when executed by the processor, causes the processor to display an on-screen order form in which authorized users can enter orders for furniture and housewares;
a fifth sequence of instructions which, when executed by the processor, causes the processor to verify that order form has been completed;
an sixth sequence of instructions which, when executed by the processor, causes the processor to calculate the total cost of said order, including tax;

a seventh sequence of instructions which, when executed by the processor, causes the processor to send said order to a supplier; and an eight sequence of instructions which, when executed by the processor, causes the processor to electronically send a message indicating the order was placed successfully.

16. The computer program product of claim 15, further comprising:

a ninth sequence of instructions which, when executed by the processor, causes the processor to display at least one service request form in which authorized users can enter requests for services;

a tenth sequence of instructions which, when executed by the processor, causes the processor to verify that the at least one service request form has been completed;

an eleventh sequence of instructions which, when executed by the processor, causes the processor to send said at least one service request form to a supplier; and a twelfth sequence of instructions which, when executed by the processor, causes the processor to electronically send a message indicating the at least one service request form was submitted successfully.

* * * * *